US009517462B2

(12) United States Patent
Roesch et al.

(10) Patent No.: US 9,517,462 B2
(45) Date of Patent: Dec. 13, 2016

(54) TWO-LAYER-THREE-WAY CATALYST

(75) Inventors: Martin Roesch, Rodgau (DE); Dieter Linder, Hanau (DE); Raoul Klingmann, Alzenau (DE); Patrizia Laura De Cola, Ludwigsburg (DE); Joerg-Michael Richter, Frankfurt a.M. (DE); Marcus Schmidt, Ginsheim (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 1574 days.

(21) Appl. No.: 12/530,580

(22) PCT Filed: Feb. 16, 2008

(86) PCT No.: PCT/EP2008/001216
§ 371 (c)(1),
(2), (4) Date: Jan. 27, 2010

(87) PCT Pub. No.: WO2008/113445
PCT Pub. Date: Sep. 25, 2008

(65) Prior Publication Data
US 2010/0135879 A1 Jun. 3, 2010

(30) Foreign Application Priority Data
Mar. 19, 2007 (EP) .................................. 07005547

(51) Int. Cl.
*B01J 23/00* (2006.01)
*B01J 23/10* (2006.01)
(Continued)

(52) U.S. Cl.
CPC .......... *B01J 37/0244* (2013.01); *B01D 53/945* (2013.01); *B01J 23/63* (2013.01);
(Continued)

(58) Field of Classification Search
USPC ............... 502/302–304, 325, 332, 333, 334, 336,502/338, 339, 341, 100, 300; 423/635–636, 423/640, 164, 155
See application file for complete search history.

(56) References Cited

U.S. PATENT DOCUMENTS 5,212,142 A * 5/1993 Dettling ............... B01D 53/945
423/213.5
5,597,771 A 1/1997 Hu
(Continued)

FOREIGN PATENT DOCUMENTS

EP 0875290 A 11/1998
EP 0885650 A2 12/1998
(Continued)

OTHER PUBLICATIONS

International Preliminary Report on Patentability issued in corresponding International Application No. PCT/EP2008/001216 filed on Feb. 16, 2008.
(Continued)

*Primary Examiner* — James McDonough
(74) *Attorney, Agent, or Firm* — Smith, Gambrell & Russell, LLP

(57) ABSTRACT

A double-layer three-way catalyst is presented, which is formed from a catalytic coating applied directly to an inert honeycomb and a catalytically active coating thereon, and is suitable especially for cleaning of exhaust gases of motor vehicles with gasoline-operated internal combustion engines. The catalyst contains, in each layer, an active aluminum oxide and a cerium/zirconium mixed oxide, both of which are catalytically activated by palladium. The second layer on the gas side contains not only palladium but also rhodium, which is applied to the active aluminum oxide and the cerium/zirconium mixed oxide of the second layer in addition to the palladium. The cerium/zirconium mixed oxide of the second layer has a higher zirconium oxide content than the cerium/zirconium mixed oxide of the first layer. The catalyst is notable for exceptional activity coupled with outstanding aging stability.

23 Claims, 4 Drawing Sheets

(51) Int. Cl.
*B01J 25/00* (2006.01)
*B01J 21/00* (2006.01)
*B01J 29/00* (2006.01)
*B01J 37/02* (2006.01)
*B01D 53/94* (2006.01)
*B01J 23/63* (2006.01)
B01J 23/44 (2006.01)
B01J 23/46 (2006.01)

(52) U.S. Cl.
CPC ........... *B01D 2255/1021* (2013.01); *B01D 2255/1023* (2013.01); *B01D 2255/1025* (2013.01); *B01D 2255/2042* (2013.01); *B01D 2255/407* (2013.01); *B01D 2255/9022* (2013.01); *B01J 23/44* (2013.01); *B01J 23/464* (2013.01); *Y02T 10/22* (2013.01)

(56) References Cited

U.S. PATENT DOCUMENTS

| | | | |
|---|---|---|---|
| 6,080,375 A * | 6/2000 | Mussmann | B01D 53/944 423/212 |
| 6,103,660 A * | 8/2000 | Yperen | B01J 23/63 423/213.2 |
| 6,852,666 B1 * | 2/2005 | Bouly | B01D 53/9422 502/302 |
| 2003/0061860 A1 * | 4/2003 | Hu | B01D 53/9454 73/23.31 |
| 2003/0180197 A1 | 9/2003 | Nunan | |
| 2004/0198595 A1 * | 10/2004 | Chen | B01D 53/945 502/328 |
| 2005/0227867 A1 * | 10/2005 | Chen | B01D 53/945 502/325 |

FOREIGN PATENT DOCUMENTS

| | | |
|---|---|---|
| EP | 0957064 A1 | 11/1999 |
| EP | 1046423 A2 | 10/2000 |
| EP | 1541220 A | 6/2005 |
| WO | WO 95/35152 A1 | 12/1995 |

OTHER PUBLICATIONS

Internatioal Search Report issued in priority international application No. PCT/EP2008/001216 filed on Feb. 16, 2008.

* cited by examiner

TWO-LAYER-THREE-WAY CATALYST

This application claims the benefit of International Application PCT/EP2008/001216 filed Feb. 16, 2008 and EP Application 07005547 filed Mar. 19, 2007 which are relied on and incorporated herein by reference.

INTRODUCTION AND BACKGROUND

The invention relates to a three-way catalyst which is formed from two superposed catalytically active layers, is suitable for the cleaning of the exhaust gases of internal combustion engines, and has outstanding catalytic activity coupled with exceptional thermal aging stability.

Three-way catalysts are used in large numbers for the cleaning of the exhaust gases of internal combustion engines operated under essentially stoichiometric conditions. They are capable of converting the three significant gaseous pollutants of the engine, specifically hydrocarbons, carbon monoxide and nitrogen oxides, simultaneously to harmless components. Double-layer catalysts are frequently used, which enable a separation of different catalytic processes and hence an optimal balance of the catalytic effects in the two layers. Catalysts of this kind are described, for example, in EP 1 046 423, EP 0 885 650 or WO 95/35152. When such double-layer catalysts comprise palladium as the catalytically active noble metal, their preparation generally ensures that palladium is present spatially separated from the rhodium which is likewise present as a catalytically active component. For instance, the catalysts described in EP 0 885 650 and WO 95/35152 always comprise rhodium (optionally in the presence of platinum) in the outer, second catalyst layer, whereas palladium (optionally likewise in the presence of platinum) is always present in the inner, first layer. The reason for this usually very careful spatial separation of the noble metals rhodium and palladium lies in the assumption, considered to be valid to date, that these two noble metals, when in direct contact with one another, lose their catalytic activity at the high temperatures typical for three-way catalysts as a result of the formation of intermetallic phases. This would be equivalent to the irreversible thermal deactivation of the catalyst.

In contrast, EP 1 541 220 describes a single-layer, palladium-rich three-way catalyst in which, in the preferred embodiment, at least 70% by weight of the palladium and rhodium present is present in unalloyed state under alloying conditions. The support materials present are preferably zirconium-rich cerium/zirconium oxygen storage materials and γ-aluminum oxide. To prepare the catalyst described, all components used are combined in one suspension and coated onto a support body. In the resulting catalyst, all catalytically active materials are thus present in the spatial proximity of one another.

US 2003/0180197 A1 discloses a catalyst comprising a catalytic metal compound and a macroporous compound, said macroporous compound comprising an oxygen storage material and an aluminum oxide. The catalyst is characterized in that at least 40% of the macropore volume of the oxygen storage material and/or of the aluminum oxide is associated with pores having a pore diameter greater than 120 Å. Apart from a two-layer embodiment of the catalyst with palladium in one layer and rhodium in the other layer, the document also discloses a one-layer catalyst which is produced by coating a substrate with a palladium-containing washcoat and subsequent penetration of the upper 10 micrometers of the coating with a rhodium compound.

The constantly rising demands on reducing the emissions of internal combustion engines necessitate constant further development of the catalysts. Of particular significance are the lightoff temperatures of the catalyst for the conversion of the pollutants and the thermal stability thereof. The lightoff temperature for a pollutant specifies the temperature from which this pollutant is converted to an extent of more than, for example, 50%. The lower these temperatures are, the earlier the pollutants can be converted after a cold start. At full load, exhaust gas temperatures of up to 1150° C. can occur directly at the engine outlet. The better the thermal stability of the catalyst, the closer it can be arranged to the engine. This likewise improves emission control after a cold start.

The catalysts according to the prior art cited already have very good properties with regard to lightoff temperatures and thermal stability. However, the toughened legislation necessitates the search for even better catalysts.

SUMMARY OF THE INVENTION

It was therefore an object of this invention to provide a catalyst which, compared to the prior art catalysts, has further-reduced lightoff temperatures and an improved thermal stability.

This object is achieved by a catalyst which has two superposed catalytically active coatings on an inert catalyst support of ceramic or metal. Each catalytically active layer comprises an active aluminum oxide and a cerium/zirconium mixed oxide, which are catalytically activated with palladium. The two oxide materials in the second layer are additionally catalytically activated with rhodium. Moreover, it is essential for the inventive catalyst that the cerium/zirconium mixed oxide in the second layer has a higher zirconium oxide content than the cerium/zirconium mixed oxide in the first layer.

In the context of this document, the term "first layer" always refers to that coating which is applied first to the inert catalyst support, i.e. the layer on the support side. The so-called "second layer" is then applied to this layer on the support side, and is in direct contact with the exhaust gas to be cleaned in the finished catalyst.

The selected composition of the layers described in the main claim surprisingly achieves a significant improvement in the lightoff performance and in the thermal stability of the inventive catalyst over prior art catalysts. A possible reason for this improvement, especially with regard to the catalyst described in EP 1 541 220, is probably that the spatial separation of the oxidic support materials is maintained. Studies by the inventor have shown that the supporting of rhodium on a zirconium-rich cerium/zirconium oxide generally leads to more aging-stable catalysts than the supporting of rhodium on low-zirconium cerium/zirconium oxide. By virtue of the strict compliance with this spatial separation of the oxidic support materials, it is especially possible with the inventive catalysts, in the case of suitable selection of the noble metal concentrations, to satisfy the very strict emissions standards for SULEVs and PZEVs (SULEV=Super Ultra-low Emission Vehicle; PLEV=Partial Zero Emission Vehicle). With prior art catalysts, this is not directly possible.

Suitable catalytically inert catalyst supports are honeycombs of ceramic or metal with a volume V, which have parallel flow channels for the exhaust gases of the internal combustion engine. The wall surfaces of the flow channels are coated with the two inventive catalyst layers. To coat the catalyst support, the solids intended for the particular layer are suspended in water. In the case of the first layer, these are active aluminum oxide and a first cerium/zirconium mixed oxide. Palladium is deposited onto these materials proceeding from preferably palladium nitrate by the process described in U.S. Pat. No. 6,103,660, using barium hydroxide or strontium hydroxide as the base. The suspension thus obtained can immediately be used to coat the catalyst support. The layer applied is subsequently dried and optionally calcined. Thereafter, the second coating is applied. To this end, active aluminum oxide and a second cerium/zirconium mixed oxide are again suspended in water, and palladium and rhodium are deposited thereon by supplying palladium nitrate and rhodium nitrate, it being possible to accomplish the deposition of the noble metals simultaneously in one operation or successively in different operations.

A total of 0.1 to 10 g/l of palladium based on the volume of the honeycomb is introduced into the inventive catalyst. The amounts of the palladium nitrate in the coating steps are selected such that the concentration of the palladium in the second layer is less than the concentration of the palladium in the first layer. The ratio of the concentration of the palladium in the second layer relative to the concentration of the palladium in the first layer, based in each case on the volume of the honeycomb, is preferably between 0.001 and 0.9, more preferably between 0.01 and 0.7. Particularly advantageous embodiments are obtained when the described ratio of the palladium concentrations is between 0.1 and 0.5.

The use of barium hydroxide or strontium hydroxide as the base for the precipitation of palladium nitrate in the first layer leads, after final calcination, to barium oxide or strontium oxide remaining, having been deposited on the surface of the active aluminum oxide and of the cerium/zirconium mixed oxide.

The rhodium concentration in the second layer of the inventive catalyst is preferably between 0.01 and 1 g/l of rhodium, based on the volume of the honeycomb.

Alternatively to the procedure described, the noble metals can also be deposited separately on any solid component of the catalyst. Only thereafter are, for example, palladium-activated aluminum oxide and palladium-activated cerium/zirconium mixed oxide suspended together in water and applied to the catalyst support. Such a procedure enables the concentration of the catalytically active noble metals on aluminum oxide on the one hand, and cerium/zirconium mixed oxide on the other hand, to be established in a controlled manner. For the separate deposition of the noble metals onto aluminum oxide and cerium/zirconium mixed oxide, preference is given to using the process described in EP 957 064.

The noble metal concentrations which should actually be employed depend on the desired pollutant conversions. The highest concentration values specified here are required for compliance with the strict emissions standards for SULEVs and PZEVs. In the case of particular demands on the activity, the catalyst may, in a specific embodiment, as well as palladium and rhodium, also comprise platinum. Preference is then given to catalytically activating active aluminum oxide and/or cerium/zirconium mixed oxide in the second layer additionally with platinum, such that the second layer then comprises palladium, rhodium and platinum. The concentration of the platinum, based on the volume of the honeycomb, is then preferably between 0.01 and 1 g/l.

The active aluminum oxide of the first and second layers is preferably stabilized by doping with 1 to 10% by weight of lanthanum oxide, based on the total weight of the aluminum oxide. This doping brings about an improvement in the thermal stability of the catalyst.

In order to achieve a further improving effect with regard to the thermal stability, the cerium/zirconium mixed oxides in the two layers may be stabilized with at least one oxide of the metals selected from the group consisting of iron, manganese, titanium, silicon, yttrium, lanthanum, praseodymium, neodymium, samarium and mixtures thereof. The amount of the transition metal oxides used for doping is preferably between 1 and 15% by weight, more preferably between 5 and 10% by weight, based on the total weight of the stabilized mixed oxide.

According to the invention, the cerium/zirconium mixed oxide of the second layer has a higher zirconium oxide content than the cerium/zirconium mixed oxide of the first layer. Preferably, a weight ratio of cerium oxide to zirconium oxide of 0.8 to 1.2 is present in the first layer in the cerium/zirconium mixed oxide. The cerium/zirconium mixed oxide in the second layer preferably has a weight ratio of cerium oxide to zirconium oxide of 0.5 to 0.1. The specific surface area of these materials is advantageously within a range between 50 and 100 $m^2/g$. In the case of particular demands on the lightoff performance of the catalyst, an additional cerium/zirconium mixed oxide with a weight ratio of cerium oxide to zirconium oxide of 0.5 to 0.1 may additionally also be present in the first layer.

In order to satisfy particular demands on the lifetime of the catalyst under high thermal stresses, zirconium oxide can additionally be added to the second layer of the inventive catalyst. This zirconium oxide is preferably stabilized with 1 to 30% by weight of rare earth oxide, based on the total weight thereof; in the particularly suitable embodiment, not more than 10% by weight of cerium oxide, based on the total weight of the stabilized zirconium oxide, is present in the material.

Moreover, the addition of lanthanum oxide or neodymium oxide to the first layer of the inventive catalyst may be advantageous.

Catalysts prepared according to the technical teaching demonstrated here are suitable especially as three-way catalysts for cleaning exhaust gases of a motor vehicle equipped with a gasoline engine. They can equally be used as a close-coupled starter catalyst or as an underfloor main catalyst of the motor vehicle. Both the combination of a corresponding close-coupled starter catalyst with other catalyst types, for example nitrogen oxide storage catalysts, and a combination of inventive starter catalysts and inventive main catalysts is suitable, according to the motor vehicle application.

BRIEF DESCRIPTION OF DRAWING

The invention is illustrated in detail hereinafter with reference to some examples and figures. The figures show.

DETAILED DESCRIPTION OF INVENTION

Figure 1:
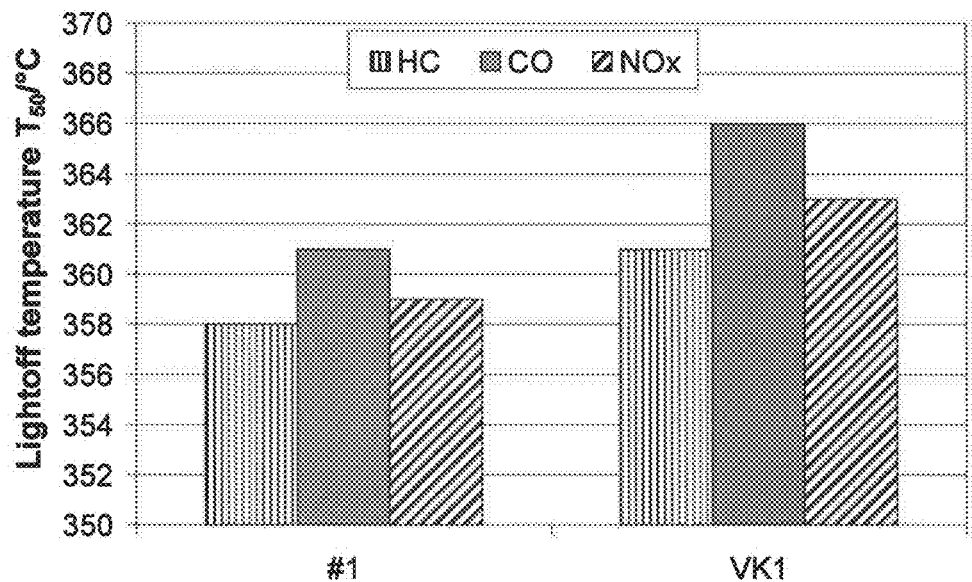
FIG. 1: comparison of the lightoff temperatures of an inventive catalyst (#1) and of a double-layer catalyst according to the prior art (VK1), the temperatures plotted being those at which 50% of the target conversion was attained ($T_{50}$)

Preparation and Testing of the Catalysts Described in the Examples and Comparative Examples:

To prepare the catalysts described in examples and comparative examples, cordierite honeycombs with a diameter of 10.16 cm and a length of 10.16 cm were coated. The honeycombs had a cell density of 93 cells per square centimeter at a cell wall thickness of 0.11 mm.

Two different coating suspensions were applied successively to these honeycombs. After the application of the first coating suspension, the parts were dried and calcined. This was followed by the coating with the second coating suspension, and likewise a drying and calcination.

Before the testing, all catalysts thus obtained were subjected to aging over the duration of 19 hours on an engine test bed with a conventional gasoline engine with overrun fuel cutoff. The exhaust gas temperature upstream of the catalyst inlet during the aging was 950° C.

Aging was followed by, on the engine test bed, the examination of the lightoff temperatures and the $CO/NO_x$ crossing points by the customary test methods known to those skilled in the art. The examination of the lightoff performance was carried out in slightly rich exhaust gas, i.e. at an air ratio λ of the exhaust gas of 0.999, up to an exhaust gas temperature upstream of the catalyst inlet of 450° C. The $CO/NO_x$ crossing points were determined at an exhaust gas temperature of 400° C. with a λ cycle with a frequency of 1 Hz and an amplitude of ±½ A/F. The space velocity in both cases was approx. 100,000 $h^{-1}$.

Comparative Example 1

Production of the First Layer:

An aluminum oxide stabilized with 3% by weight of lanthanum oxide (specific surface area 140 $m^2/g$) and a cerium/zirconium mixed oxide with a zirconium oxide content of 50% by weight was activated according to U.S. Pat. No. 6,103,660 using strontium hydroxide as the base, together with palladium proceeding from palladium nitrate. The resulting suspension was used directly to coat the honeycombs. After the coating, the honeycombs were dried and calcined. The finished first layer contained the following amounts of coating:

| | |
|---|---|
| 80 g/l | of lanthanum-stabilized aluminum oxide |
| 55 g/l | of cerium/zirconium mixed oxide with 50% by weight of $ZrO_2$ |
| 10 g/l | of strontium oxide (on all components) |
| 3.32 g/l | of palladium (on all components) |

Production of the Second Layer:

The lanthanum oxide-stabilized aluminum oxide and a cerium/zirconium mixed oxide with a zirconium oxide content of 70% by weight were suspended in water. Thereafter, an aqueous solution of rhodium nitrate was supplied to the suspension with constant stirring, and the honeycombs which had already been provided with the first layer were coated with the second coating suspension, dried and calcined. The finished second layer contained the following amounts of coating:

| | |
|---|---|
| 70 g/l | of lanthanum-stabilized aluminum oxide |
| 65 g/l | of cerium/zirconium mixed oxide with 70% by weight of $ZrO_2$ |
| 0.21 g/l | of rhodium (on all components) |

The total noble metal loading of the resulting catalyst VK1 was 3.53 g/l based on the volume of the honeycomb.

Example 1

Production of the First Layer:

An aluminum oxide stabilized with 3% by weight of lanthanum oxide (specific surface area 140 $m^2/g$) and a cerium/zirconium mixed oxide with a zirconium oxide content of 50% by weight were activated according to U.S. Pat. No. 6,103,660 using strontium hydroxide as the base, together with palladium proceeding from palladium nitrate. The resulting suspension was used directly to coat the honeycombs. After the coating, the honeycombs were dried and calcined. The finished first layer contained the following amounts of coating:

| | |
|---|---|
| 76 g/l | of lanthanum-stabilized aluminum oxide |
| 50 g/l | of cerium/zirconium mixed oxide with 50% by weight of $ZrO_2$ |
| 2 g/l | of strontium oxide (on all components) |
| 2.83 g/l | of palladium (on all components) |

Production of the Second Layer:

The lanthanum oxide-stabilized aluminum oxide and a cerium/zirconium mixed oxide with a zirconium oxide content of 70% by weight were suspended in water. Thereafter, an aqueous solution of rhodium nitrate and palladium nitrate was supplied to the suspension with constant stirring, and the honeycombs already provided with the first layer were coated with the second coating suspension, dried and calcined. The finished second layer contained the following amounts of coating:

| | |
|---|---|
| 65 g/l | of lanthanum-stabilized aluminum oxide |
| 65 g/l | of cerium/zirconium mixed oxide with 70% by weight of $ZrO_2$ |
| 0.49 g/l | of palladium (on all components) |
| 0.21 g/l | of rhodium (on all components) |

The total noble metal loading of the catalyst #1 thus prepared was 3.53 g/l based on the volume of the honeycomb. The ratio of the concentration of the palladium in the second layer relative to the concentration of the palladium in the first layer, based in each case on the volume of the honeycomb, was 0.173.

Results of the Catalyst Testing:

The inventive catalyst #1 was examined in comparison to the likewise double-layer catalyst according to the prior art from comparative example 1 (VK1). Both catalysts were first subjected to the aging already described and then tested on an engine test bed and in a vehicle on a roller test bed.

Figure 2:
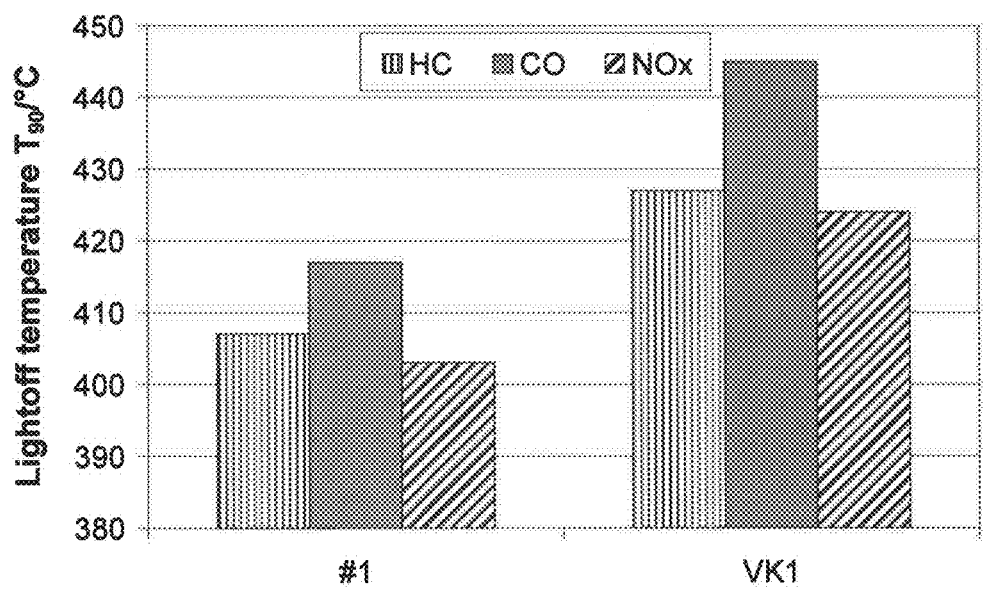
FIG. 2: comparison of the lightoff temperatures of an inventive catalyst (#1) and of a double-layer catalyst according to the prior art (VK1), the temperatures plotted being those at which 90% of the target conversion was attained ($T_{90}$)

FIGS. 1 and 2 show a comparison of the lightoff temperatures, FIG. 1 being a plot of the temperatures at which 50% of the target conversion was attained ($T_{50}$), while FIG. 2 shows the temperatures at which 90% of the target conversion was attained ($T_{90}$). The inventive catalyst #1 has significantly lower lightoff temperatures. Especially the $T_{90}$ values for #1 are 20° to 30° below those of the comparative catalyst according to the prior art, VK1.

Figure 3:
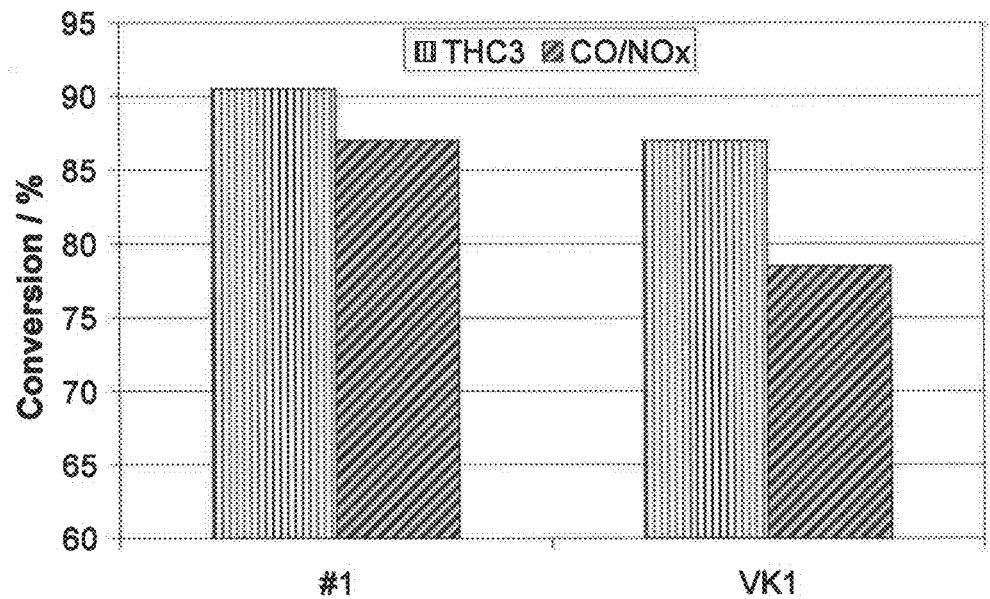
FIG. 3: lambda intersection/CO/$NO_x$— crossing points of the inventive catalyst #1 compared to a double-layer catalyst according to the prior art (VK1) at an exhaust gas temperature of 400° C. and a λ cycle with a frequency of 1 Hz with an amplitude of ±½ A/F. The plot shows the conversion values for CO and $NO_x$ at the crossing point of the conversion curves ($CO/NO_x$) and, designated as THC3, the measured hydrocarbon conversions, calculated as propane, at the CO/NOx crossing points.

The performance advantages of the inventive catalyst over the comparative example are significantly more pronounced in the lambda intersection (FIG. 3). FIG. 3 shows the conversion values for CO and NO at the crossing point of the conversion curves ($CO/NO_x$) and, designated as THC3, the hydrocarbon conversions measured, calculated as propane, at the CO/NOx crossing points. In each case, the values averaged from rich/lean and lean/rich transitions are reported. The advantages of the inventive catalyst can be attributed to the activation of the active aluminum oxide and zirconium-rich cerium/zirconium mixed oxide in the second layer by palladium.

Figure 4:
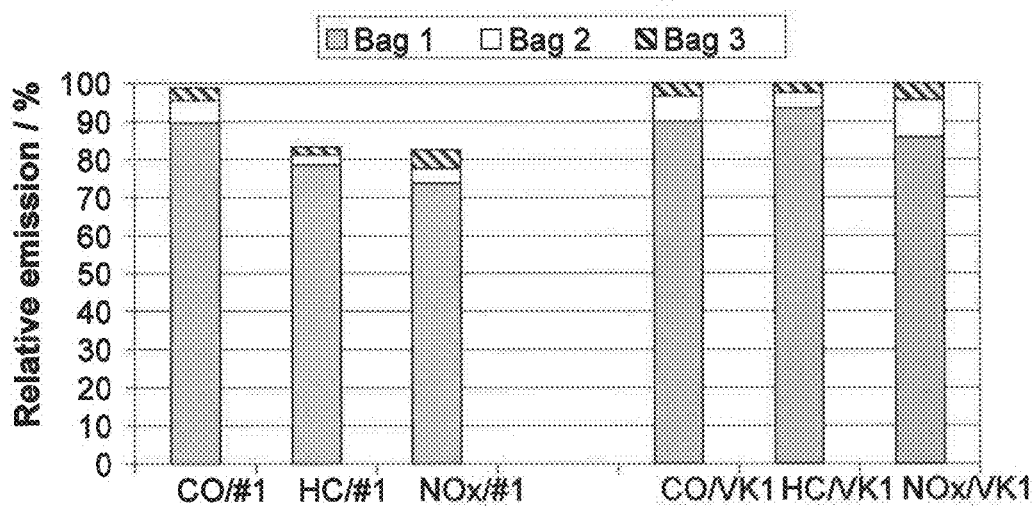
FIG. 4: relative emissions of the inventive catalyst #1 in the NEDC motor vehicle test with the emission values of the double-layer catalyst according to the prior art VK1 as the reference parameter.

The advantages of the inventive catalyst #1 over the double-layer comparative catalyst VK1 according to the prior art which are observed on the engine test bed were confirmed in an NEDC vehicle test. FIG. 4 shows the measured emission values relative to one another. The total emissions of the comparative catalyst VK1 were equated to 100 and constitute the reference point. The bag results obtained demonstrate a considerable advantage of the inventive catalyst #1, especially in the cold start phase (bag 1). However, in the other phases of the test cycle (bags 2 and 3) too, lower emissions are observed for #1 than for VK1.

Comparative Example 2

To prepare a catalyst with a structure according to EP 1 541 220, two layers of identical coating suspension were applied. To prepare the coating suspension, the lanthanum oxide-stabilized aluminum oxide, a cerium/zirconium mixed oxide with a zirconium oxide content of 50% by weight and a cerium/zirconium mixed oxide with a zirconium oxide content of 70% by weight were suspended in water. Thereafter, an aqueous solution of rhodium nitrate and palladium nitrate was supplied to the suspension with constant stirring and the honeycomb was coated twice, dried and calcined. Each finished layer had the following composition:

| | |
|---|---|
| 70 g/l | of lanthanum-stabilized aluminum oxide |
| 25 g/l | of cerium/zirconium mixed oxide with 50% by weight of $ZrO_2$ |
| 32.5 g/l | of cerium/zirconium mixed oxide with 70% by weight of $ZrO_2$ |
| 1 g/l | of strontium oxide (on all components) |
| 0.07 g/l | of rhodium (on all components) |
| 0.37 g/l | of palladium (on all components) |

The total noble metal loading of the resulting catalyst VK2 was 0.88 g/l based on the volume of the honeycomb.

Example 2

Production of the First Layer:

The first layer was prepared as described in example 1. After completion, it contained the following amounts of coating:

| | |
|---|---|
| 76 g/l | of lanthanum-stabilized aluminum oxide |
| 50 g/l | of cerium/zirconium mixed oxide with 50% by weight of $ZrO_2$ |
| 2 g/l | of strontium oxide (on all components) |
| 0.56 g/l | of palladium (on all components) |

Production of the Second Layer:

The second layer was also produced in the manner described in example 1. The finished second layer contained the following amounts of coating:

| | |
|---|---|
| 65 g/l | of lanthanum-stabilized aluminum oxide |
| 65 g/l | of cerium/zirconium mixed oxide with 70% by weight of $ZrO_2$ |
| 0.18 g/l | of palladium (on all components) |
| 0.14 g/l | of rhodium (on all components) |

The total noble metal loading of the catalyst #2 thus obtained was 0.88 g/l based on the volume of the honeycomb. The ratio of the concentration of the palladium in the second layer relative to the concentration of the palladium in the first layer, based in each case on the volume of the honeycomb, was 0.316.

Results of the Catalyst Testing:

The inventive catalyst #2 from example 2 was examined in comparison to the VK2 prepared according to EP 1 541 220 from comparative example 2. In order to ensure better comparability, the same materials were used and both catalysts were configured as double-layer catalysts, except that VK2 contained two identical layers after completion. After an aging performed as described, the catalysts were tested on an engine test bed.

Figure 5:
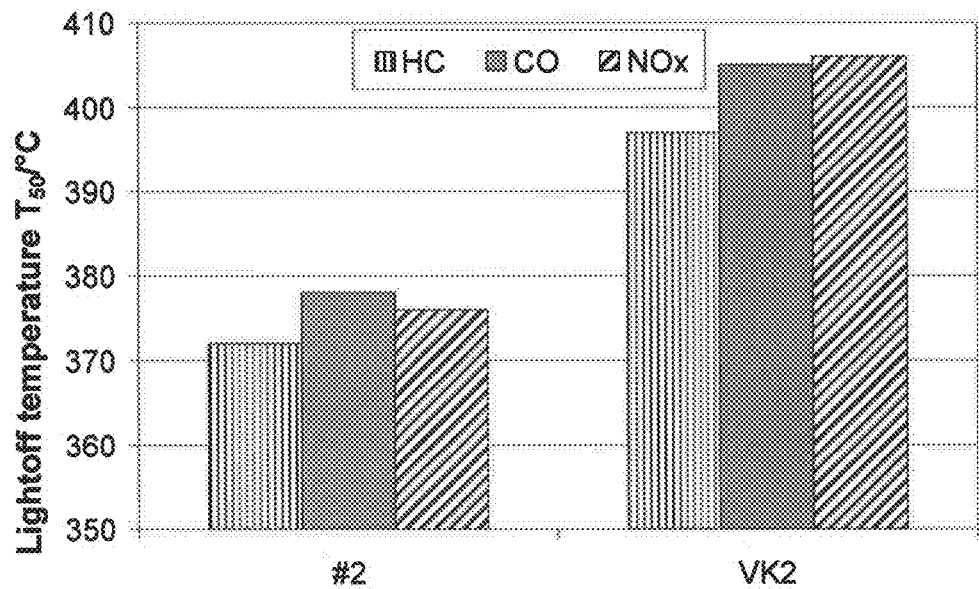
FIG. 5: comparison of the lightoff temperatures of an inventive catalyst (#2) and of a catalyst according to EP 1 541 220 (VK2), the plotted temperatures being those at which 50% of the target conversion was attained ($T_{50}$)
Figure 6:
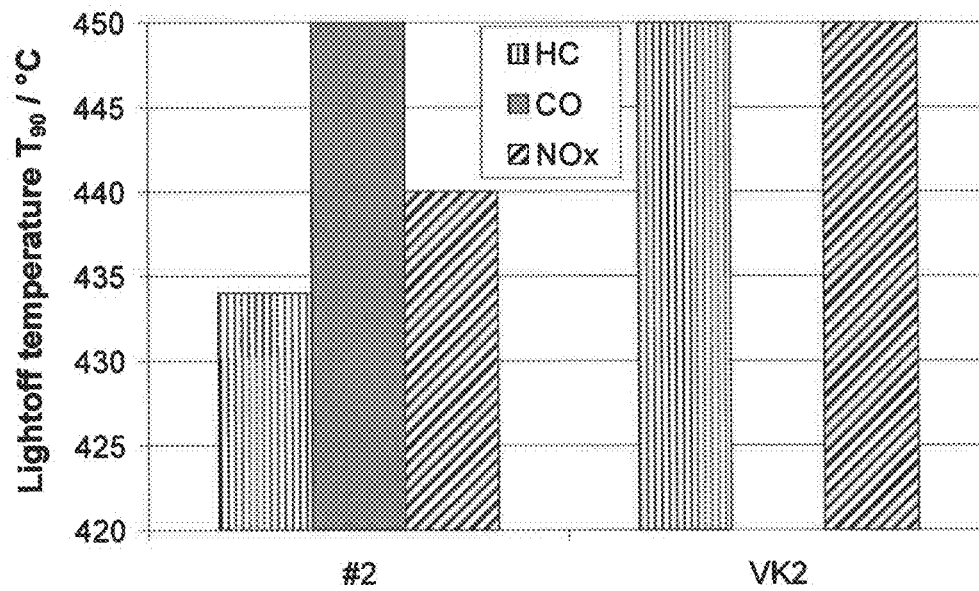
FIG. 6: comparison of the lightoff temperatures of an inventive catalyst (#2) and of a catalyst according to EP 1 541 220 (VK2), the plotted temperatures being those at which 90% of the target conversion was attained ($T_{90}$)

FIGS. 5 and 6 show a comparison of the lightoff temperatures, FIG. 5 being a plot of the temperatures at which 50% of the target conversion was attained ($T_{50}$), while FIG. 6 shows the temperatures at which 90% of the target conversion was attained ($T_{90}$). The lightoff temperatures $T_{50}$ of the inventive catalyst #2 are, according to the pollutant gas considered, 25° to 30° below those of the comparative catalyst VK2. In the case of the $T_{90}$ values, values in the range of 430-450° C. according to the pollutant gas were determined for the inventive catalyst #2. For the comparative catalyst, $T_{90}$ values of 450° C. (end temperature of measurement range) were determined for $NO_x$ and HC. The $T_{90}$ value for CO was not determinable: a target conversion of 90% CO was not achieved within the temperature range examined.

Figure 7:
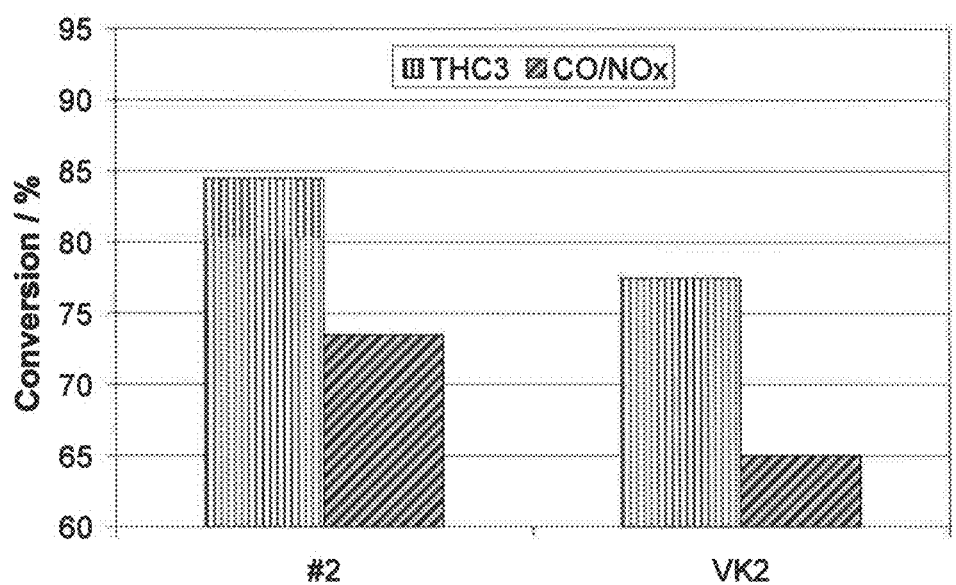
FIG. 7: lambda intersection/$CO/NO_x$ crossing points of the inventive catalyst #2 compared to a catalyst according to EP 1 541 220 (VK2) at an exhaust gas temperature of 400° C. and a λ cycle with a frequency of 1 Hz with an amplitude of ±½ A/F. The plot shows the conversion values for CO and $NO_x$ at the crossing point of the conversion curves ($CO/NO_x$) and, designated as THC3, the hydrocarbon conversions measured, calculated as propane, at the CO/NOx crossing points.

In the lambda intersection too (FIG. 7), the performance advantages of the inventive catalyst #2 over the catalyst according to EP 1 541 220 (VK2) are clearly evident.

The measured data demonstrate that the rigorous spatial separation of particular oxidic support materials and the prevention of contact of rhodium with the relatively low-zirconium cerium/zirconium mixed oxide of the first layer leads to activity advantages of the resulting catalysts, especially after aging.

The invention claimed is:

1. A double-layer three-way catalyst on an inert catalyst support of ceramic or metal for the cleaning of the exhaust gases of internal combustion engines, said double-layer three-way catalyst comprises
a first layer containing a first active aluminum oxide and a first cerium/zirconium mixed oxide, which are catalytically activated with palladium and is essentially free of rhodium, and
a second layer containing a second active aluminum oxide and a second cerium/zirconium mixed oxide, which are catalytically activated with palladium and rhodium, and
wherein the second cerium/zirconium mixed oxide has a higher zirconium oxide content than the first cerium/zirconium mixed oxide.

2. The three-way catalyst as claimed in claim 1, wherein the catalyst support is a honeycomb of ceramic or metal with a volume V, which has parallel flow channels for the exhaust gases of the internal combustion engine, the wall surfaces of the flow channels being coated with the two catalyst layers, and the concentration of the palladium based on the volume of the honeycomb being between 0.1 and 10 g/l.

3. The three-way catalyst as claimed in claim 2, wherein the concentration of the palladium in the second layer is less than the concentration of the palladium in the first layer, based in each case on the volume of the honeycomb.

4. The three-way catalyst as claimed in claim 3, wherein the ratio of the concentration of the palladium in the second layer based on the volume of the honeycomb relative to the concentration of the palladium in the first layer based on the volume of the honeycomb is between 0.001 and 0.9.

5. The three-way catalyst as claimed in claim 4, wherein the first active aluminum oxide and the second cerium/zirconium mixed oxide are additionally surface coated with strontium oxide or barium oxide.

6. The three-way catalyst as claimed in claim 1, wherein the concentration of the rhodium in the second layer based on the volume of the honeycomb is between 0.01 and 1 g/l.

7. The three-way catalyst as claimed in claim 6, wherein the second active aluminum oxide and/or the second cerium/zirconium mixed oxide is additionally catalytically activated with platinum and the concentration of the platinum based on the volume of the honeycomb is between 0.01 and 1 g/l.

8. The three-way catalyst as claimed in claim 1, wherein the active aluminum oxides of the two layers are each stabilized with 1 to 10% by weight of lanthanum oxide, based on the total weight of the aluminum oxide.

9. The three-way catalyst as claimed in claim 1, wherein the cerium/zirconium mixed oxides of the two layers are each stabilized with 1 to 15% by weight of metal oxides, based on the total weight of the mixed oxides, said metal oxides being those of the metals selected from the group consisting of iron, manganese, titanium, silicon, yttrium, lanthanum, praseodymium, neodymium, samarium and mixtures thereof.

10. The three-way catalyst as claimed in claim 9, wherein the first cerium/zirconium mixed oxide has a weight ratio of cerium oxide to zirconium oxide of 0.8 to 1.2, and the second cerium/zirconium mixed oxide has a weight ratio of cerium oxide to zirconium oxide of 0.5 to 0.1.

11. The three-way catalyst as claimed in claim 10, wherein the first layer additionally comprises a third cerium/zirconium mixed oxide with a weight ratio of cerium oxide to zirconium oxide of 0.5 to 0.1.

12. The three-way catalyst as claimed in claim 11, wherein the second layer additionally comprises zirconium oxide.

13. The three-way catalyst as claimed in claim 12, wherein the zirconium oxide is stabilized with 1 to 30% by weight of rare earth oxide, based on the total weight of the zirconium oxide.

14. The three-way catalyst as claimed in claim 13, wherein the zirconium oxide contains not more than 10% by weight of cerium oxide, based on the total weight of the stabilized zirconium oxide.

15. The three-way catalyst as claimed in claim 1, wherein the first layer additionally comprises lanthanum oxide or neodymium oxide.

16. A process for cleaning exhaust gases of a gasoline engine comprising passing said gases in contact with the catalyst according to claim 1 as a close-coupled starter catalyst or as an underfloor main of a motor vehicle equipped with said gasoline engine.

17. The three-way catalyst of claim 1, wherein the first layer is catalytically activated with only palladium.

18. The three-way catalyst of claim 1, wherein the second layer is catalytically activated with only palladium and rhodium.

19. The three-way catalyst of claim 1, wherein the first layer is catalytically activated with only palladium and the second layer is catalytically activated with only palladium and rhodium.

20. A double-layer three-way catalyst on an inert catalyst support of ceramic or metal for the cleaning of the exhaust gases of internal combustion engines, said double-layer three-way catalyst comprises
a first layer containing a first active aluminum oxide and a first cerium/zirconium mixed oxide, which are catalytically activated with palladium, wherein the palladium is dispersed throughout the first layer, and
a second layer containing a second active aluminum oxide and a second cerium/zirconium mixed oxide, which are catalytically activated with palladium and rhodium, and
wherein the second cerium/zirconium mixed oxide has a higher zirconium oxide content than the first cerium/zirconium mixed oxide.

21. The double-layer three-way catalyst of claim 20, wherein the amount of palladium in the first layer is greater than an amount of rhodium.

22. The double-layer three-way catalyst of claim 21, wherein the first layer is substantially free of rhodium.

23. A double-layer three-way catalyst on an inert catalyst support of ceramic or metal for the cleaning of the exhaust gases of internal combustion engines, said double-layer three-way catalyst comprises
a first layer containing a first active aluminum oxide and a first cerium/zirconium mixed oxide, which are catalytically activated with palladium and does not contain rhodium, and
a second layer containing a second active aluminum oxide and a second cerium/zirconium mixed oxide, which are catalytically activated with palladium and rhodium,
wherein the second cerium/zirconium mixed oxide has a higher zirconium oxide content than the first cerium/zirconium mixed oxide, and
wherein the first layer is designed not to contain rhodium.

* * * * *